(No Model.)
F. KOPP.
FIRE ESCAPE.
No. 522,990. Patented July 17, 1894.
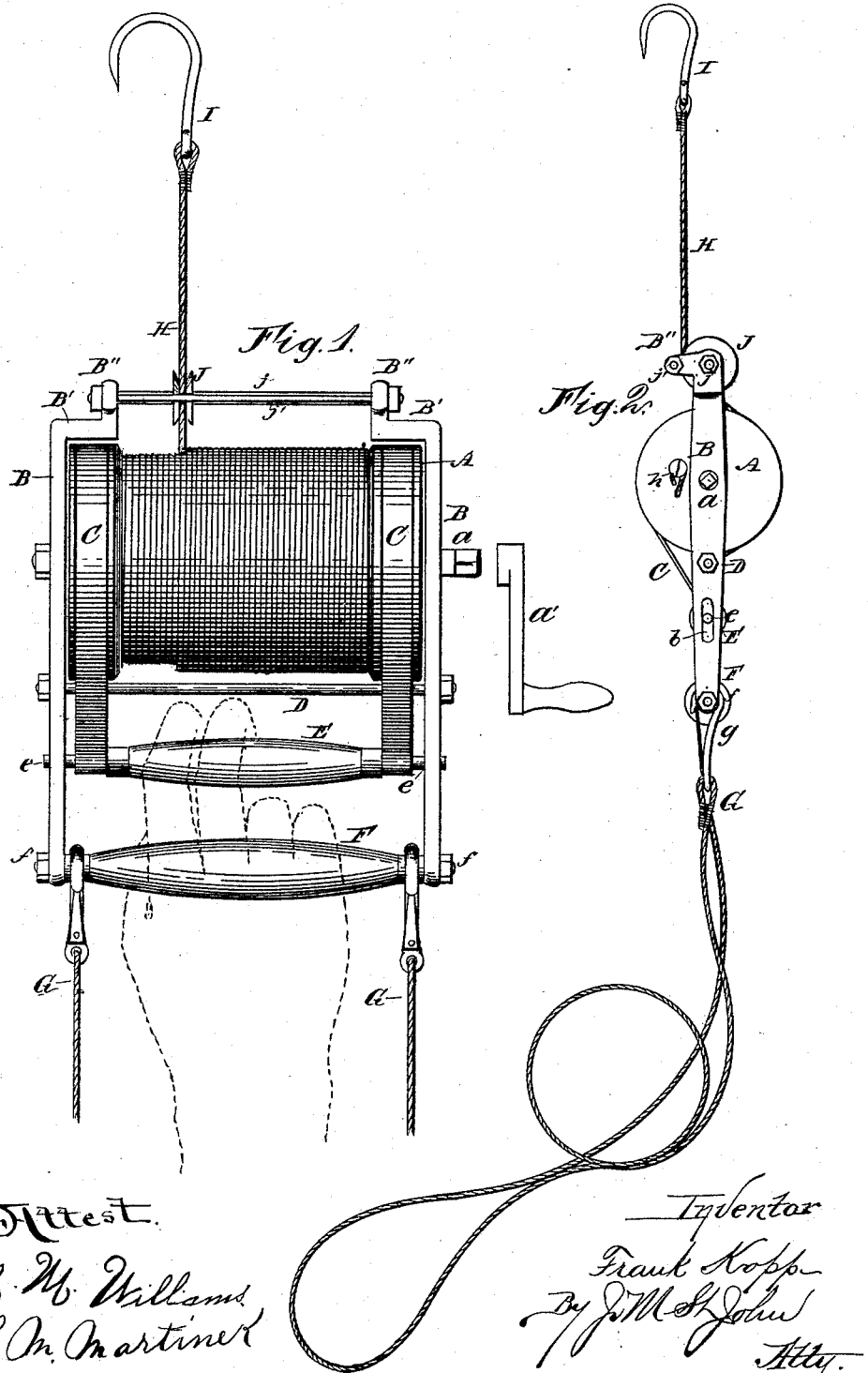

UNITED STATES PATENT OFFICE.

FRANK KOPP, OF CEDAR RAPIDS, IOWA.

FIRE-ESCAPE.

SPECIFICATION forming part of Letters Patent No. 522,990, dated July 17, 1894.

Application filed September 22, 1893. Serial No. 486,194. (No model.)

*To all whom it may concern:*

Be it known that I, FRANK KOPP, a citizen of the United States, residing at Cedar Rapids, in the county of Linn and State of Iowa, have invented certain new and useful Improvements in Fire-Escapes; and I do hereby declare the following to be a full, clear, and exact description of the invention, such as will enable others skilled in the art to which it appertains to make and use the same.

The object of this invention is to produce a compact and convenient fire-escape, whereby descent may be made from elevated portions of a burning building quickly and with perfect safety.

The invention consists in the construction, combination and arrangement of parts, as hereinafter fully set forth and claimed.

In the accompanying drawings, forming a part of this specification, Figure 1 is a plan view of a device embodying my invention, and Fig. 2 is a side elevation of the same.

Similar letters of reference indicate corresponding parts.

Referring now to the drawings, A is a spool or reel, provided with a fixed axle $a$ journaled in the side-arms B B. The axle has a squared end adapted to take a crank $a'$, which is preferably removable. By means of the crank the cable H is conveniently wound upon the reel.

The arms B B are connected at the lower ends by a handle F, the stem of which is provided with suitable nuts $f\,f$. At the upper end the arms are inwardly offset at B', the offset being preferably extended a little inside of the inner line of the reel-head, so that the cable is prevented from winding up on either head. The upper ends are connected by a tie-rod $j$, on which is loosely mounted a sheave J. Just beyond the periphery of this sheave on one side is another tie-rod $j'$, secured in suitable extensions or lugs B'' B''. The cable passes from the reel over this sheave, and is kept in place by the tie-rod $j'$, as shown. The purpose of the sheave is to furnish a guide for the cable, whereby its draft upon the reel is the better centralized and controlled. It will be understood that the sheave moves freely the whole length of the tie-rod $j$ between the arms.

The revolution of the reel is controlled by a brake consisting of a pair of metallic bands C C encircling the heads of the reel, secured at one end to a tie-rod D connecting the arms B B, and at the other end to a handle E, the stem of which, $e$, is free to move a limited distance in slots $b\,b$ in said arms.

A small wire cable, H, is suitably secured at one end to the reel at $h$, and at the other end is provided with a strong, sharp-pointed hook I, by means of which the upper end of the cable is readily attached to the window-sill, or other wood-work of the apartment.

In order that the operator need not support his entire weight by his hand (or hands), as indicated in Fig. 1, the lower end of the device should be provided with a loop G, adapted to pass under the thigh, thus furnishing additional support for the body. This may be connected with the arms B B or handle F in any suitable way, as by snap-hooks $g\,g$.

The operation of the device is indicated in Fig. 1. The upper end of the cable being attached to some suitable support, the operator grasps the handle F, and with one or two fingers manipulates the brake-handle E. The brake is of such a nature that a comparatively light pressure of the handle E is sufficient to sustain the weight of two or more persons, and by slackening the pressure slightly an easy and safe descent is made. The loop G is not indispensable, since the descent from quite a height might be made by a single hand, but as this would be attended with some danger it is at all times preferable to place the leg through the loop in descending, as indicated above.

The device, as will be seen, is very compact in form, and though made of non-combustible material, excepting the handles, which are preferably made of wood, may be made so light as to be easily carried in an ordinary valise.

Having thus described my invention, I claim—

1. In a fire escape, the combination of a reel, a retaining frame therefor, having a cross-bar at the lower end forming a handle whereby the operator may be wholly supported by the hand grasping said handle, a brake engaging with said reel and having a handle within reach of one or more of the fingers of the hand grasping the supporting handle, a cable attached to said reel, a guide-sheave for the same at the upper end of said frame, and means substantially as described for holding the cable in said sheave.

2. In a fire-escape, the combination of the reel A, frame B B, having offsets B' B' and lugs B'' B'', the brake C C, connected at one end with the tie-rod D and at the other with the handle E having terminal stems e e adapted to move a limited distance in slots b b in said frame, the handle F, the guide-sheave J mounted on tie-rod j, the retaining rod j' and the cable H attached at one end to the reel, and at the other end provided with means for anchoring, substantially as and for the purpose set forth.

3. In a fire-escape, the combination with a reel, retaining frame, and connected cable, substantially as described, of the herein described guide for the cable, consisting of the sheave J, the tie-rod j, and the retaining rod j'.

In testimony whereof I affix my signature in presence of two witnesses.

FRANK KOPP.

Witnesses:
WILLIAM A. OTTO,
L. M. MARTINEK.